(12) United States Patent
Nogawa

(10) Patent No.: US 11,381,162 B2
(45) Date of Patent: Jul. 5, 2022

(54) ELECTRONIC DEVICE AND CONTROL METHOD

(71) Applicant: CANON KABUSHIKI KAISHA, Tokyo (JP)

(72) Inventor: Yuki Nogawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 4 days.

(21) Appl. No.: 17/027,991

(22) Filed: Sep. 22, 2020

(65) Prior Publication Data

US 2021/0091658 A1 Mar. 25, 2021

(30) Foreign Application Priority Data

Sep. 24, 2019 (JP) .............................. JP2019-173405

(51) Int. Cl.
*H02M 3/07* (2006.01)
*H02M 1/14* (2006.01)
*H02M 1/15* (2006.01)
*H02M 1/00* (2006.01)

(52) U.S. Cl.
CPC .............. *H02M 3/07* (2013.01); *H02M 1/14* (2013.01); *H02M 1/007* (2021.05); *H02M 1/15* (2013.01); *H02M 3/072* (2021.05)

(58) Field of Classification Search
CPC ........ H02M 3/07; H02M 3/072; H02M 1/007; H02M 1/14; H02M 1/15
See application file for complete search history.

(56) References Cited

U.S. PATENT DOCUMENTS

| 6,724,241 B1 * | 4/2004 | Bedarida ................. H02M 3/07 327/536 |
| 2007/0091655 A1 | 4/2007 | Oyama et al. |
| 2020/0119635 A1 * | 4/2020 | Rahimi ............... H02M 7/4837 |

FOREIGN PATENT DOCUMENTS

| JP | 2007-074797 A | 3/2007 |
| JP | 2015154627 A * | 8/2015 |

* cited by examiner

*Primary Examiner* — Jue Zhang
(74) *Attorney, Agent, or Firm* — Cowan, Liebowitz & Latman, P.C.

(57) ABSTRACT

An electronic device includes a first switched capacitor unit that steps down the input voltage, a second switched capacitor unit that steps down the output voltage of the first switched capacitor unit, and a control unit that controls the first switched capacitor unit and the second switched capacitor unit such that the electronic device operates in either a first mode for suppressing fluctuations of output voltage by the first switched capacitor unit and the second switched capacitor unit or a second mode for giving priority to power efficiency by the first switched capacitor unit and the second switched capacitor unit.

8 Claims, 7 Drawing Sheets

ELECTRONIC DEVICE AND CONTROL METHOD

BACKGROUND

Field of the Invention

Aspects of the disclosure generally relate to an electronic device having a voltage conversion circuit for converting an input voltage into a predetermined output voltage, and a method of controlling such an electronic device.

Description of the Related Art

Japanese Patent Laid-Open No. 2007-074797 describes a method of reducing fluctuations (ripples) of an output voltage in a DC/DC converter in which charge pump circuits are connected in series.

However, Japanese Patent Laid-Open No. 2007-074797 does not describe a switched capacitor circuit that steps down an input voltage to a predetermined output voltage.

Furthermore, Japanese Patent Laid-Open No. 2007-074797 assumes a case where a power supplied to a load is small, and the fluctuations of the output voltage is suppressed by synchronizing a switching frequency of a preceding charge pump circuit and a switching frequency of a subsequent charge pump circuit at a sacrifice of a power efficiency (output power/input power). However, in the switched capacitor circuit that steps down the input voltage to the predetermined output voltage, it is assumed that the power supplied to the load is large, therefore it is necessary to consider the power efficiency.

SUMMARY

According to an aspect of the embodiments, there is provided a device, a method or the like that is capable of selecting an operation of suppressing fluctuations (ripples) of an output voltage or an operation of prioritizing a power efficiency.

According to an aspect of the embodiments, there is provided an electronic device comprising: a first switched capacitor unit that steps down the input voltage; a second switched capacitor unit that steps down the output voltage of the first switched capacitor unit; and a control unit that controls the first switched capacitor unit and the second switched capacitor unit such that the electronic device operates in either a first mode for suppressing fluctuations of output voltage by the first switched capacitor unit and the second switched capacitor unit or a second mode for giving priority to power efficiency by the first switched capacitor unit and the second switched capacitor unit.

According to an aspect of the embodiments, there is provided a method comprising: causing a first switched capacitor unit to step down an input voltage; causing a second switched capacitor unit to step down an output voltage of the first switched capacitor unit; and controlling the first switched capacitor unit and the second switched capacitor unit such that the electronic device operates in either a first mode of suppressing the ripple of the output voltage by the first switched capacitor unit and the second switched capacitor unit or a second mode of prioritizing the power efficiency by the first switched capacitor unit and the second switched capacitor unit.

Further aspects of the embodiments will become apparent from the following embodiments.

DESCRIPTION OF THE EMBODIMENTS

Exemplary embodiments, features, and aspects of the disclosure will be described below with reference to the drawings. However, aspects of the disclosure are not limited to the following embodiments.

First Embodiment

Figure 1:
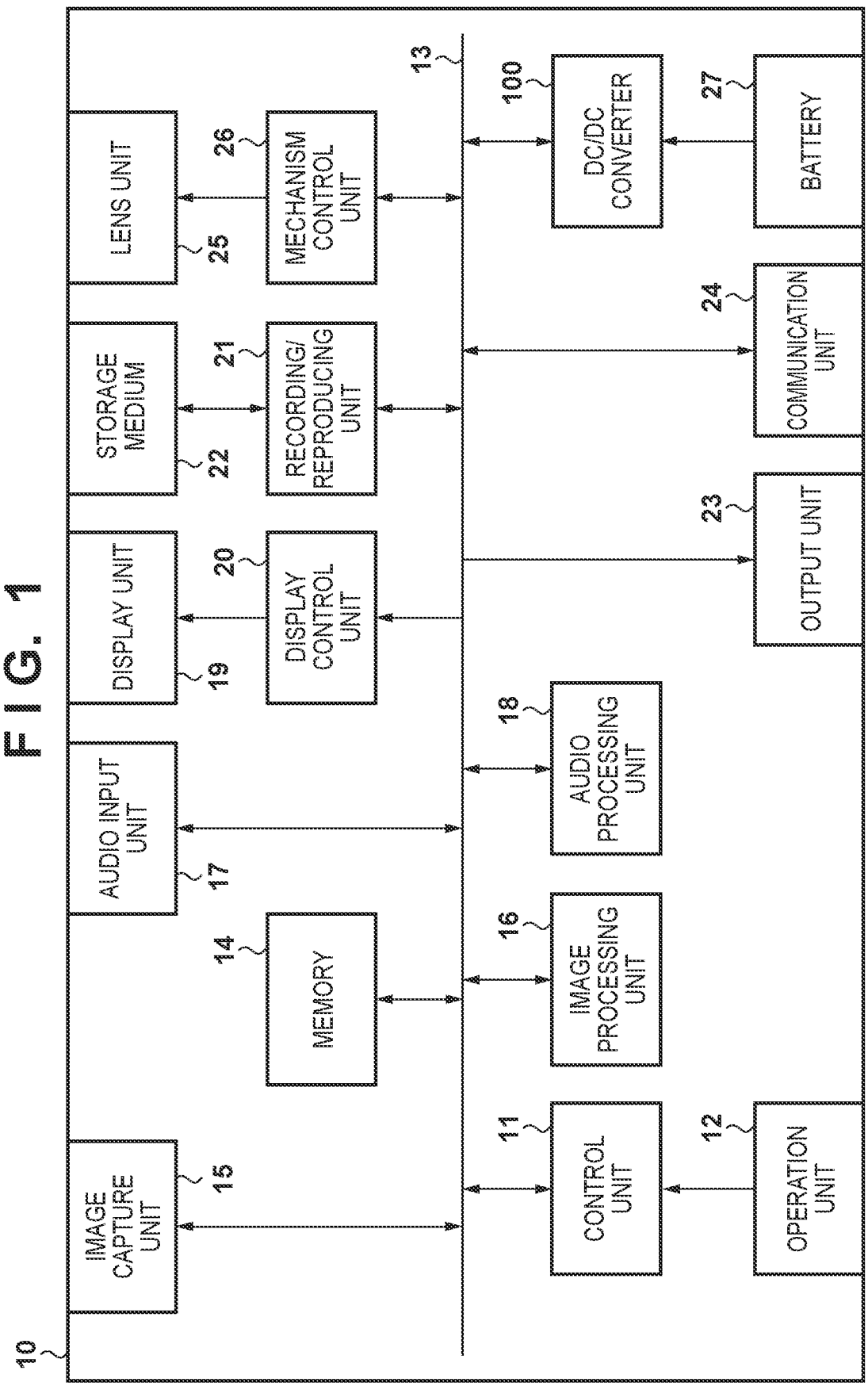
FIG. 1 is a block diagram illustrating an example of components of an electronic device 10 according to a first embodiment.

First, components of the electronic device 10 according to a first embodiment will be described with reference to FIG. 1. However, components of the electronic device 10 according to the first embodiment are not limited to the components shown in FIG. 1. The electronic device 10 can operate as any one or at least one of an image capture apparatus (e.g., a digital camera), a mobile phone (e.g., a smartphone), and a mobile terminal (e.g., a tablet terminal).

A battery 27 is a power source of the DC/DC converter 100 and is also a power source of the electronic device 10.

The DC/DC converter 100 is a power supply circuit that converts an output voltage of the battery 27 into a predetermined voltage and supplies the voltage to each component of the electronic device 10.

A control unit 11 includes a central processing unit (CPU) or a micro processing unit (MPU), and is capable of controlling all components of the electronic device 10 by executing a program stored in a memory.

An operation unit 12 includes, for example, a power button, a recording start button, a zoom adjustment button, an auto focus button, and various operation buttons related to photographing. The operation unit 12 includes a menu display button, an enter button, other cursor keys, a pointing device, and a touch screen. When the operation unit 12 is operated by a user, the operation unit 12 transmits operation signal to the control unit 11.

A bus 13 is a general purpose bus for transmitting data and control signal to respective components of the electronic device 10.

A memory 14 includes a RAM (Random Access Memory) or the like. The memory 14 is used as a buffer memory for temporarily storing image data (still image data or moving image data) generated by an image capture unit 15.

The control unit 11 executes various processes (programs) in response to operation signal from the operation unit 12 that accepts an operation from a user to control each component of the electronic device 10, and controls data transfer between the components. The control unit 11 may be a microcomputer in which a CPU and a memory are configured as a hardware processor.

The image capture unit 15 includes an image sensor configured by a CCD (Charge-Coupled Device) or a CMOS (Complementary Metal Oxide Semiconductor). The image capture unit 15 generates image data from an optical image of an object formed on an image sensor via a lens unit 25. The image data (still image data or moving image data) generated by the image capture unit 15 is temporarily stored in the memory 14.

An image processing unit 16 processes image data (still image data or moving image data) generated by the image capture unit 15 by executing a predetermined image process. The predetermined image process includes, for example, an image quality adjustment process for adjusting white balance, color, brightness, or the like of still image data or moving image data generated by the image capture unit 15 based on a set value set by the user or a set value determined from characteristics of an image. After the predetermined image process is executed, the image processing unit 16 supplies the moving image data or the still image data to a display control unit 20 and a recording/reproducing unit 21.

An audio input unit 17 generates audio data from sound (including audio) collected by, for example, an omnidirectional microphone built in the electronic device 10 or an external microphone connected to an audio input terminal. The audio data generated by the audio input unit 17 is temporarily stored in the memory 14.

An audio processing unit 18 processes audio data generated by the audio input unit 17 by executing a predetermined audio process. After the predetermined audio process is executed, the audio processing unit 18 supplies audio data to the recording/reproducing unit 21 and a speaker unit. The speaker unit outputs the audio data supplied from the audio processing unit 18 to the outside.

The display control unit 20 displays image data (still image data or moving image data) supplied from the image processing unit 16 on the display unit 19. The display unit 19 may be, for example, a liquid crystal display panel or an organic EL display panel, or a display device connected to the electronic device 10.

The recording/reproducing unit 21 records the still image data or the moving image data supplied from the image processing unit 16 and the audio data from the audio processing unit 18 in a recording medium 22. Here, the recording medium 22 may be a recording medium built in the electronic device 10 or a recording medium removable from the electronic device 10. The recording medium 22 may be, for example, any of a hard disk, an optical disk, a magneto-optical disk, a CD-R, a DVD-R, a magnetic tape, a nonvolatile semiconductor memory, and a flash memory.

The recording/reproducing unit 21 can reproduce still image data, moving image data, or audio data recorded on the recording medium 22, from the recording medium 22. The still image data or the moving image data reproduced from the recording medium 22 is supplied to the display control unit 20. The audio data reproduced from the recording medium 22 is supplied to the speaker unit. The display control unit 20 displays the still image data or the moving image data supplied from the recording/reproducing unit 21 on the display unit 19. The speaker unit outputs the audio data supplied from the audio processing unit 18 to the outside.

An output unit 23 is an audio output terminal or an image output terminal that outputs image data or audio data as analog signal to an external apparatus.

A communication unit 24 is a communication unit that communicates with an external apparatus by wired communication or wireless communication.

The lens unit 25 includes a lens that captures an optical image of an object into the electronic device 10, an aperture mechanism that controls an amount of light, a focus mechanism that focuses the object image, and a shutter mechanism that controls an exposure time of the image sensor.

A mechanism control unit 26 controls an aperture mechanism, a focus mechanism, and a shutter mechanism of the lens unit 25 based on control signal from the control unit 11.

Next, configurations and operations of the DC/DC converter 100 according to the first embodiment will be described with reference to FIGS. 2 and 3.

Figure 2:
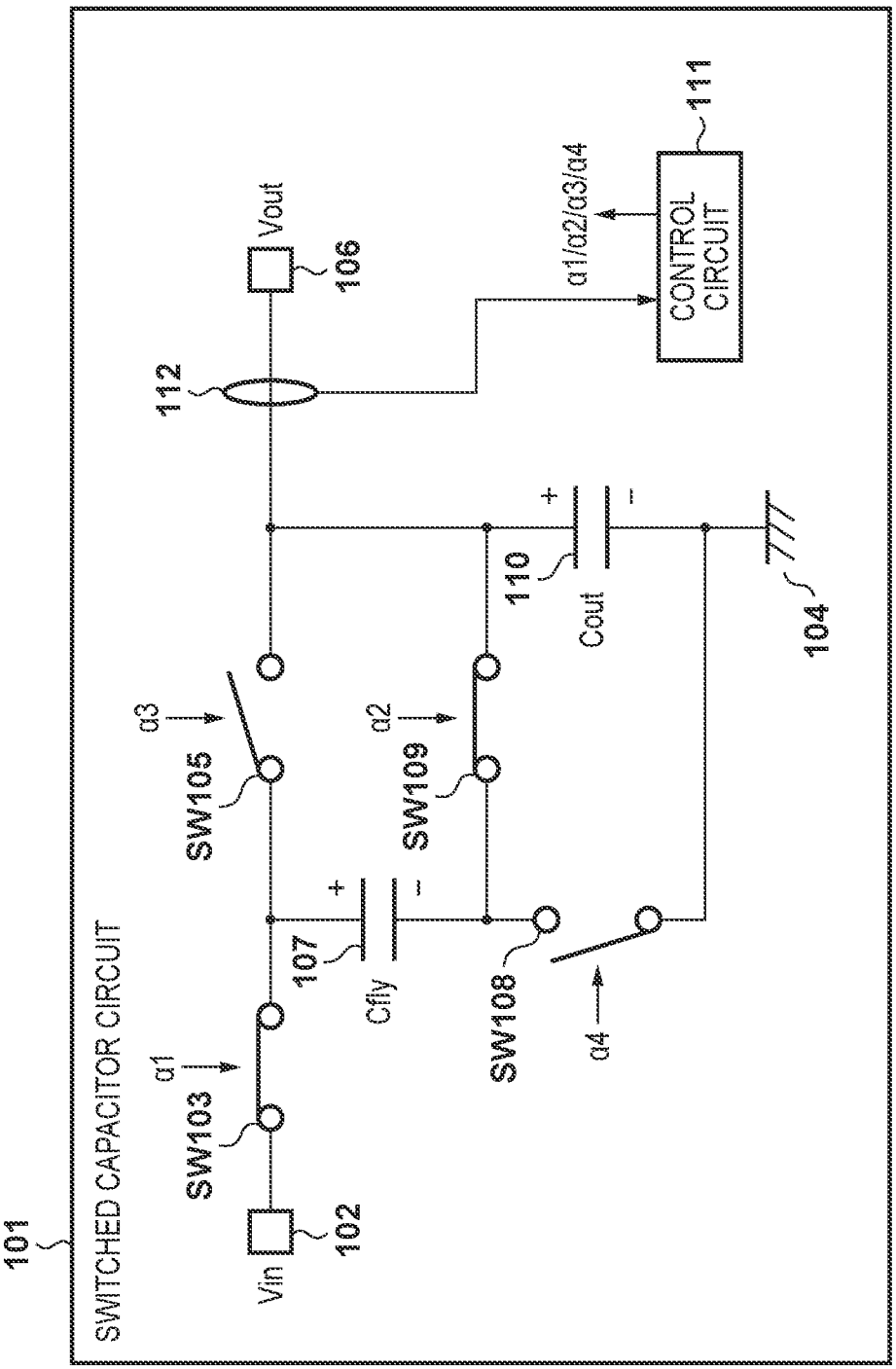
FIG. 2 is a circuit diagram illustrating an example of configuration of one switched capacitor circuit 101.

FIG. 2 shows an example of components of one switched capacitor circuit 101 of the DC/DC converter 100 according to the first embodiment.

The switched capacitor circuit 101 converts an input voltage Vin input to an input terminal 102 into a predetermined voltage, and outputs the converted voltage as an output voltage Vout from an output terminal 106.

In the first embodiment, an example in which a step-down ratio (output voltage/input voltage) of the switched capacitor circuit 101 is ½ will be described.

The switched capacitor circuit 101 includes a switch SW103, a switch SW105, a switch SW108, a switch SW109, a flying capacitor Cfly 107, an output capacitor Cout 110, a control circuit 111, and a current detection unit 112.

The input terminal 102 is connected to the switch SW103. The switch SW103 is connected to a positive side of the switch SW105 and the flying capacitor Cfly 107. The switch SW108 is connected between the flying capacitor Cfly 107 and a ground 104. The switch SW109 is connected to a negative side of the flying capacitor Cfly 107 and a positive side of the output capacitor Cout 110. The output capacitor Cout 110 is connected between the switch SW109 and the ground 104. The switch SW105 is connected between the switch SW103 and the output terminal 106.

Each of the switch SW103, the switch SW105, the switch SW108, and the switch SW109 is configured by a switch element such as MOSFET (Metal Oxide Semiconductor Field Effect Transistor). The switch SW103, the switch SW105, the switch SW108, and the switch SW109 are connected to the control circuit 111. The switch SW103, the switch SW105, the switch SW108, and the switch SW109 are switched to an ON state (energized state) or an OFF state (non-energized state) by control signal output from the control circuit 111. In the first embodiment, control signal controlling the switch SW103 is referred to as α1. Control signal controlling the switch SW109 is referred to as α2. Control signal controlling the switch SW105 is referred to as α3. Control signal controlling the switch SW108 is referred to as α4.

When supplying power to the electronic device 10 connected to the switched capacitor circuit 101, a current detection unit 112 detects a load current Iload supplied from an output terminal 106 to the electronic device 10, and notifies the control circuit 111 of the detected load current Iload.

Next, an operation in which one switched capacitor circuit 101 shown in FIG. 2 generates the output voltage Vout from the input voltage Vin will be described with reference to FIG. 3.

Figure 3:
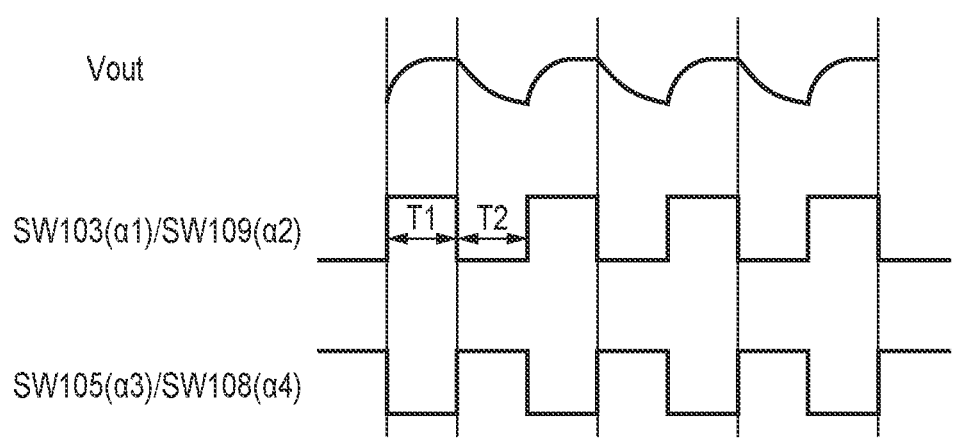
FIG. 3 is a diagram illustrating an example of a relationship between a switching operation of one switched capacitor circuit 101 and an output voltage waveform.

FIG. 3 shows an example of a relationship between a switching operation of one switched capacitor circuit 101 shown in FIG. 2 and an output voltage waveform.

In FIG. 3, the control circuit 111 sets the control signal α1 and the control signal α2 to a High state for a period T1, and sets the switches SW103 and SW109 to the energized state. On the other hand, the control circuit 111 sets the control signal α3 and the control signal α4 to a Low state for the period T1, and sets the switches SW105 and SW108 to the non-energized state. With this control, the input terminal 102 to which the input voltage Vin is applied, the flying capacitor Cfly 107, and the output capacitor Cout 110 are connected in series. The flying capacitor Cfly 107 and the output capacitor Cout 110 are charged by applying the input voltage Vin. The output voltage Vout of the output terminal 106 between the flying capacitor Cfly 107 and the output capacitor Cout 110 becomes Vin/2. This state is called a state A.

Next, the control circuit 111 sets the control signal α1 and the control signal α2 to the Low state for a period T2, and sets the switches SW103 and SW109 to the non-energized state. On the other hand, the control circuit 111 sets the control signal α3 and the control signal α4 to the High state for the period T2, and sets the switches SW105 and SW108 to the energized state. With this control, the flying capacitor Cfly 107 and the output capacitor Cout 110 connected in series in the state A are connected in parallel between the output terminal 106 and the ground 104. This state is called a state B.

The switched capacitor circuit 101 can generate the output voltage Vout in which the input voltage Vin is reduced to ½ by repeating the operation in the state A and the state B.

Next, the operation of the switched capacitor circuit 101 in the power efficiency priority mode will be described.

In the power efficiency priority mode, an operation is performed at a switching frequency Fsw [Hz] according to Equation 1.

$$Fsw=Iload/(Cfly \times Vin/2) \quad \text{(Equation 1)}$$

The load current Iload is a current detected by the current detection unit 112. The electronic device 10 connected to the switched capacitor circuit 101 operates at the switching frequency Fsw such that the output voltage Vout is generated from the input voltage Vin by a necessary amount and power is supplied to the load current Iload required by the components of the electronic device 10.

This control is executed in the power efficiency priority mode other than a ripple suppression mode described later.

<Ripple Suppression Mode>

Next, a description will be given of the operation of suppressing the fluctuations (ripples) of the output voltage Vout in the DC/DC converter 100 having the switched capacitor circuits 101 and 401 configured in multiple stages.

In the switched capacitor circuits 101 and 401 configured in multiple stages in the first embodiment, the switched capacitor circuits 101 and 401 are connected in series. In the DC/DC converter 100, the switching operation of the first switched capacitor circuit 101 in the preceding stage and the switching operation of the second switched capacitor circuit 401 in the subsequent stage are controlled.

First, the components of the electronic device 10 connected to the switched capacitor circuits 101 and 401 configured in multiple stages will be described with reference to FIG. 4.

Figure 4:
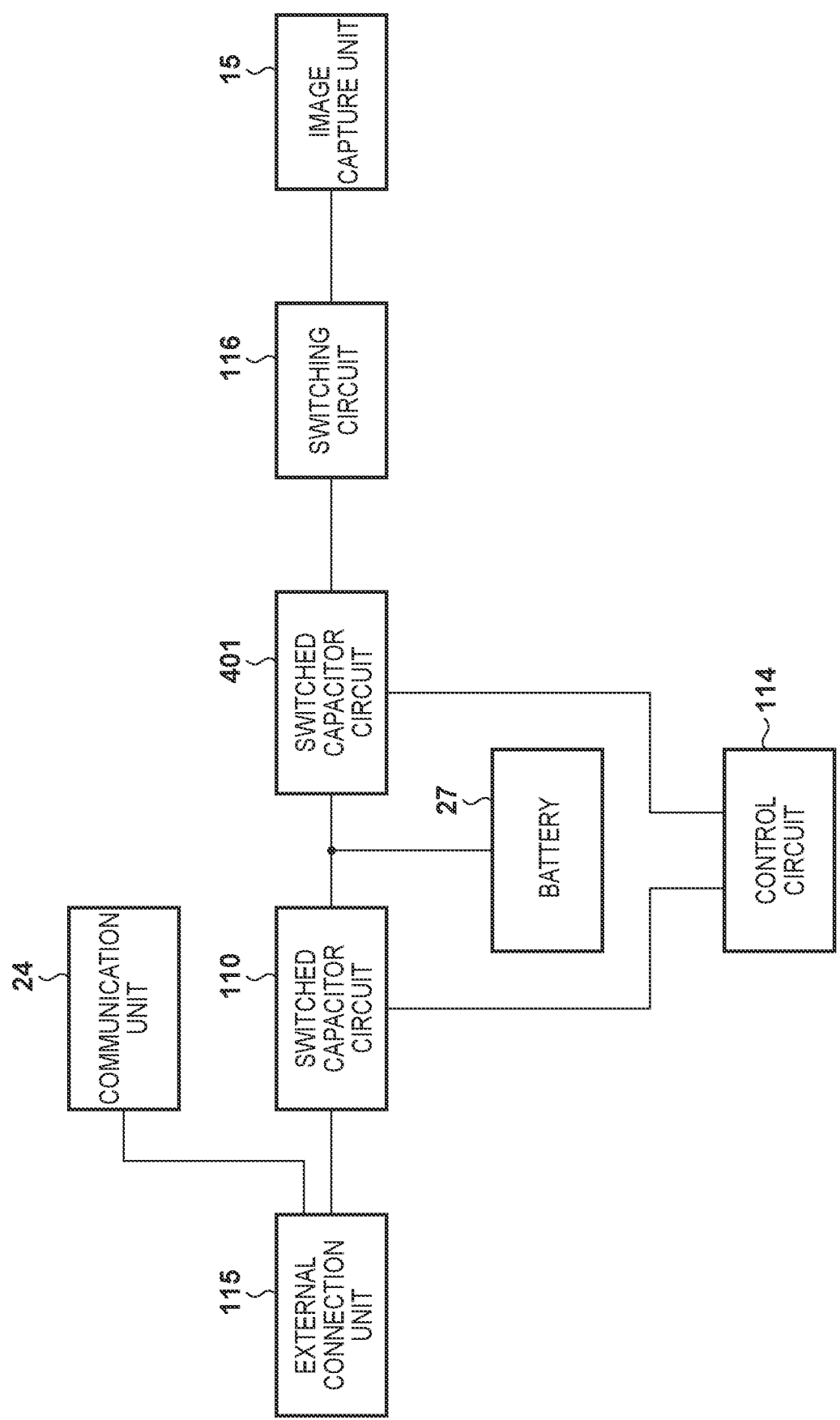
FIG. 4 is a diagram illustrating an example of components of the electronic device 10 connected to switched capacitor circuits 101 and 401 configured in multiple stages.

FIG. 4 shows an example of the components of the electronic device 10 connected to the switched capacitor circuits 101 and 401 configured in multiple stages. However, the components of the electronic device 10 connected to the switched capacitor circuits 101 and 401 configured in multiple stages are not limited to the components shown in FIG. 4.

An external connection unit 115 is an interface circuit such as USB that can be connected to an external device that can supply power to the electronic device 10. The external connection unit 115 supplies a current for charging the battery 27 via the switched capacitor circuit 101 and a second switched capacitor circuit 401.

The second switched capacitor circuit 401 converts the output voltage Voutα of the first switched capacitor circuit 101 into the input voltage of a subsequent switching circuit 116.

A control circuit 114 controls switching operations of the first switched capacitor circuit 101 and the second switched capacitor circuit 401.

The switching circuit 116 uses an inductor to convert the output voltage Voutβ of the second switched capacitor circuit 401 into a voltage necessary for the subsequent image capture unit 15.

When the switched capacitor circuits 101 and 401 are connected in series as in the DC/DC converter 100 of the first embodiment, the ripples of the output voltage Voutα of the first switched capacitor circuit 101 may be superimposed on the ripples of the output voltage Voutβ of the second switched capacitor circuit 401. The switching circuit 116 cannot suppress the ripple noise, and may affect the operation of the components (for example, the image capture unit 15) of the electronic device 10 to which the power is supplied from the DC/DC converter 100. Note that the ripple suppression mode is not limited to the case where the image capture unit 15 is operated, and may be a component that is influenced by the ripple noise in an analog manner, such as when an ISO sensitivity of the electronic device 10 is set to a predetermined sensitivity or more.

Next, with reference to FIG. 5, the configurations of the switched capacitor circuits 101 and 401 configured in multiple stages and the operation of suppressing the ripples of the output voltage Vout will be described.

Figure 5:
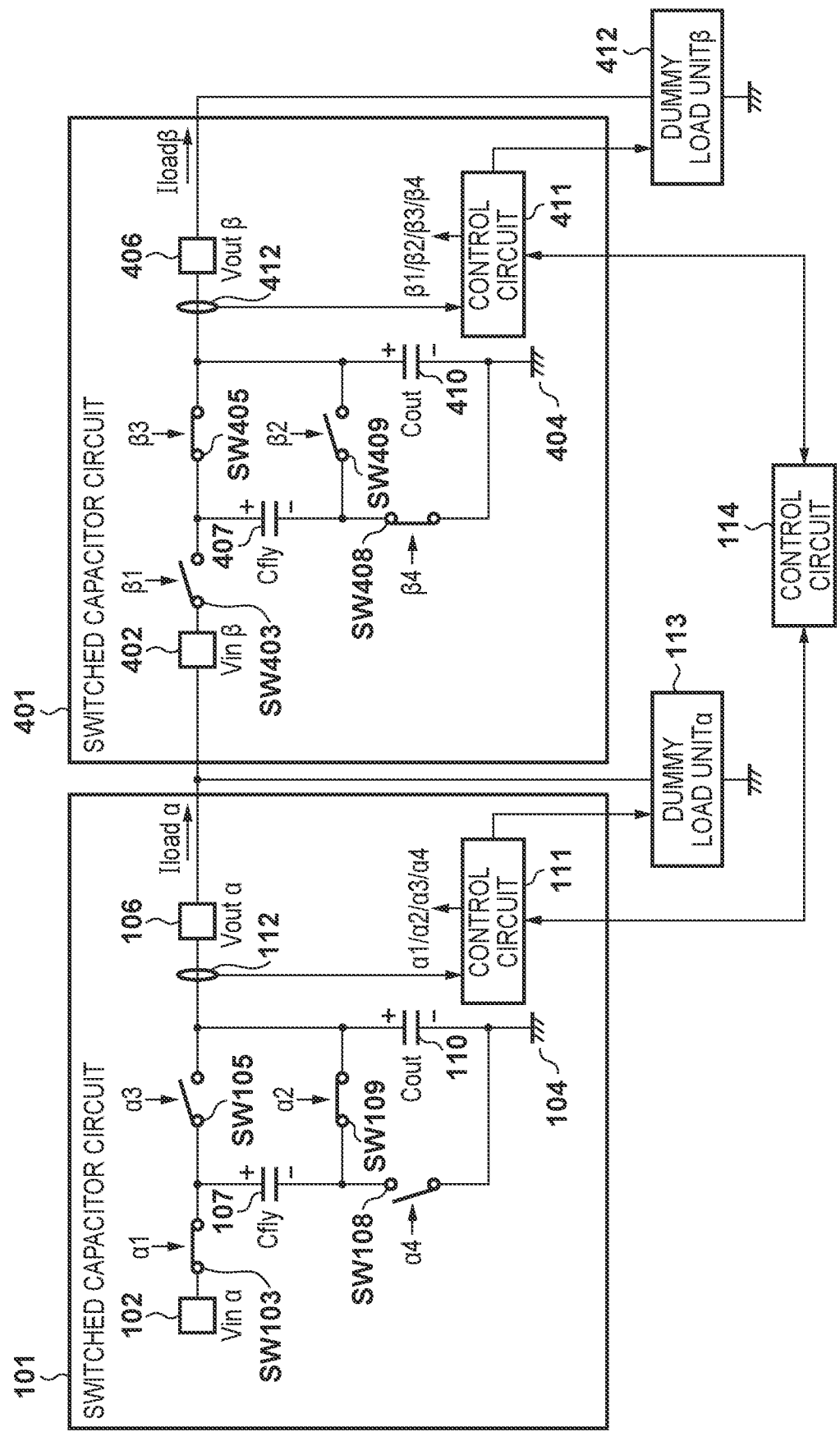
FIG. 5 is a diagram illustrating an example of configuration of the switched capacitor circuits 101 and 401 configured in multiple stages.

FIG. 5 shows an example of the configuration of the switched capacitor circuits 101 and 401 configured in multiple stages.

The circuit configuration of the second switched capacitor circuit 401 is the same as that of the first switched capacitor circuit 101 described with reference to FIG. 2, and the same components as those of the first switched capacitor circuit 101 are denoted by the reference numerals 400.

A dummy load unit α113 is connected to the output terminal 106 of the first switched capacitor circuit 101, and supplies a predetermined current in response to a command from the control circuit 111 of the first switched capacitor circuit 101.

A dummy load unit β413 is connected to an output terminal 406 of the second switched capacitor circuit 401, and supplies a predetermined current in response to a command from a control circuit 411 of the second switched capacitor circuit 401.

In the second switched capacitor circuit 401, control signal controlling the switch SW403 is referred to as β1. Control signal controlling the switch SW409 is referred to as β2. Control signal controlling the switch SW405 is referred to as β3. Control signal controlling the switch SW408 is referred to as β4.

An input terminal 402 of the second switched capacitor circuit 401 is connected to the output terminal 106 of the first switched capacitor circuit 101.

A control circuit 411 controls the switching operation of the second switched capacitor circuit 401 similarly to the control circuit 111 of the first switched capacitor circuit 101.

The control circuit 114 can acquire a currently operating switching frequency Fsw from the control circuit 111 of the first switched capacitor circuit 101 and the control circuit 411 of the second switched capacitor circuit 401.

The control circuit 111 of the first switched capacitor circuit 101 can operate the first switched capacitor circuit 101 at a predetermined switching frequency instructed by the control circuit 114. The control circuit 411 of the second switched capacitor circuit 401 can operate the second switched capacitor circuit 401 at a predetermined switching frequency instructed by the control circuit 114. The predetermined switching frequency is set to, for example, a switching frequency other than the frequency band of the audible range.

The control circuit 114 can acquire a load current Iload$\alpha$ flowing from the control circuit 111 of the first switched capacitor circuit 101 to the first switched capacitor circuit 101. The control circuit 114 can acquire a load current Iload$\beta$ flowing from the control circuit 411 of the second switched capacitor circuit 401 to the second switched capacitor circuit 401.

In a case where the electronic device 10 is in the power efficiency priority mode, the control circuit 114 operates at a switching frequency such that the output voltage Vout is generated from the input voltage Vin by a necessary amount according to the load current required by the components of the electronic device 10 and the power is supplied thereto, as shown in the Equation 1. In this case, the first switched capacitor circuit 101 and the second switched capacitor circuit 401 are individually controlled.

In a case where the electronic device 10 is in the ripple suppression mode, the control circuit 114 performs control such that the switching frequency of the first switched capacitor circuit 101 and the switching frequency of the second switched capacitor circuit 401 are synchronized to be opposite in phase.

Figure 6:
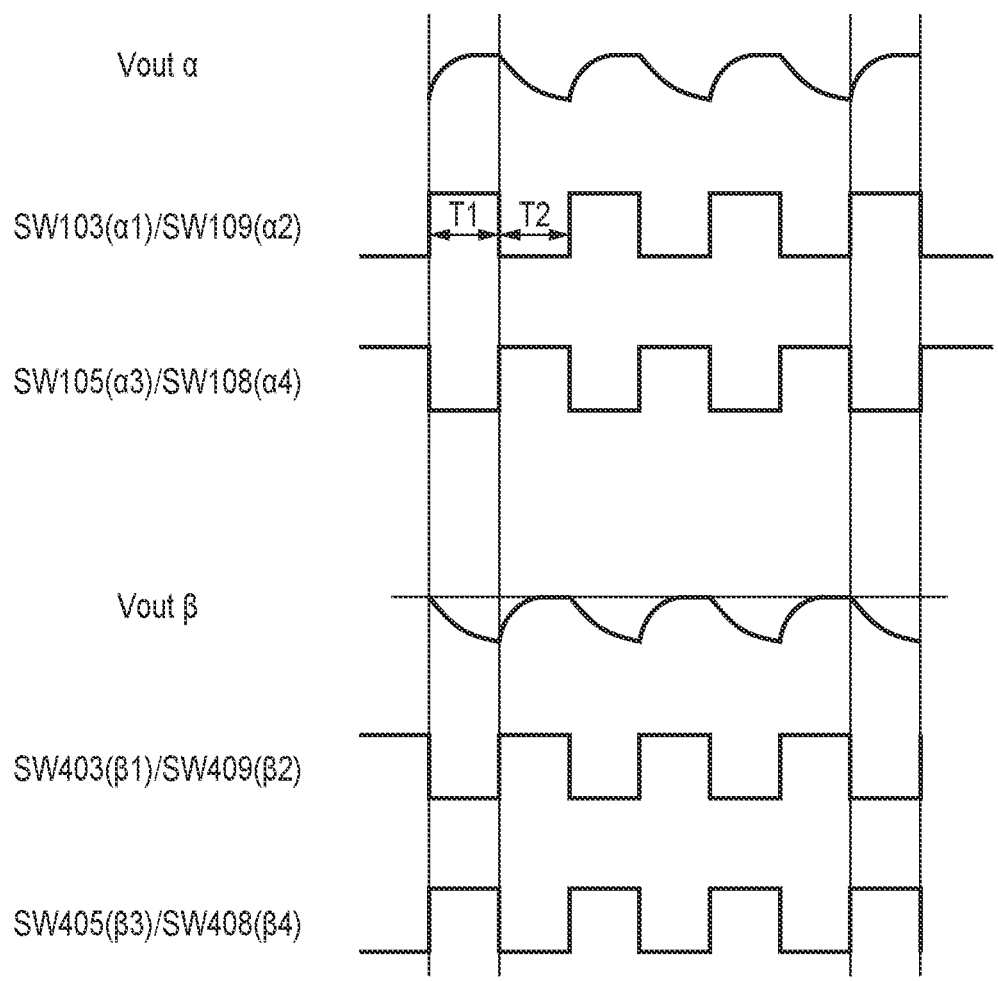
FIG. 6 is a diagram illustrating an example of a relationship between a switching operation of the switched capacitor circuits 101 and 401 configured in multiple stages and an output voltage waveform.

Next, the operation of controlling the switching frequency of the first switched capacitor circuit 101 and the switching frequency of the second switched capacitor circuit 401 to be opposite in phase in the ripple suppression mode will be described with reference to FIG. 6. FIG. 6 shows an example of the relationship between the switching operation of the switched capacitor circuits 101 and 401 configured in multiple stages and the output voltage waveform.

First, the switching frequencies of the first switched capacitor circuit 101 and the second switched capacitor circuit 401 are synchronized in order to supply the power from the input voltage Vin to the output voltage Vout without a loss in accordance with the load current Iload required by the components of the electronic device 10. In this case, the switching frequency of the first switched capacitor circuit 101 or the switching frequency of the second switched capacitor circuit 401 is adjusted to a higher one.

Let Fsw1 be the switching frequency of the first switched capacitor circuit 101, and Fsw2 be the switching frequency of the second switched capacitor circuit 401. In this case, if Fsw1>Fsw2, the control circuit 114 operates the first switched capacitor circuit 101 and the second switched capacitor circuit 401 at the switching frequency of Fsw1. If Fsw1<Fsw2, the first switched capacitor circuit 101 and the second switched capacitor circuit 401 are operated at the switching frequency of Fsw2.

As described with reference to FIG. 3, the first switched capacitor circuit 101 repeats the operation of the state A and the state B in response to the control signals $\alpha 1$, $\alpha 2$, $\alpha 3$, and $\alpha 4$ from the control circuit 111.

On the other hand, the control circuit 411 of the second switched capacitor circuit 401 sets the control signal $\beta 1$ and the control signal $\beta 2$ to the Low state for the period T1, and sets the switches SW403 and the switch SW409 to the non-energized state. On the other hand, the control circuit 411 sets the control signal $\beta 3$ and the control signal $\beta 4$ to the High state for the period T1, and sets the switch SW405 and the switch SW408 to the energized state. With this control, the flying capacitor Cfly 407 and the output capacitor Cout 410 are connected in parallel between the output terminal 406 and the ground 404. This state is called a state C.

Next, the control circuit 411 sets the control signal $\beta 1$ and the control signal $\beta 2$ to the High state for the period T2, and sets the switch SW403 and the switch SW409 to the energized state. On the other hand, the control circuit 411 sets the control signal $\beta 3$ and the control signal $\beta 4$ to the Low state during the period T2, and sets the switch SW405 and the switch SW408 to the non-energized state. With this control, the input terminal 402 to which the input voltage Vin$\beta$ is applied, the flying capacitor Cfly 407, and the output capacitor Cout 410 are connected in series. The flying capacitor Cfly 407 and the output capacitor Cout 410 are charged by applying the input voltage Vin$\beta$. The output voltage Vout$\beta$ of the output terminal 406 between the flying capacitor Cfly 407 and the output capacitor Cout 410 becomes the input voltage Vin$\beta$/2. This state is called a state D.

The second switched capacitor circuit 401 can generate the output voltage Vout$\beta$ in which the input voltage Vin$\beta$ is reduced to ½ by repeating the operation of the state C and the state D.

By combining the output voltage Vout$\alpha$ of the first switched capacitor circuit 101 and the output voltage Vout$\beta$ of the second switched capacitor circuit 401, the ripples of the output voltage Vout of the DC/DC converter 100 can be suppressed.

By controlling the switching frequency of the first switched capacitor circuit 101 and the switching frequency of the second switched capacitor circuit 401 to be opposite in phase, the ripples of the output voltage Vout can be suppressed. However, as shown in Equation 2, the ripple voltage Vrip varies in value depending on the load current Iload.

Therefore, the control circuit 114 controls the dummy load unit $\alpha 113$ and the dummy load unit $\beta 413$ such that the load current Iload$\alpha$ of the first switched capacitor circuit 101 and the load current Iloadf$\beta$ of the second switched capacitor circuit 401 are the same. The control circuit 111 of the first switched capacitor circuit 101 controls the dummy load unit $\alpha 113$ in response to a command from the control circuit 114. The control circuit 411 of the second switched capacitor circuit 401 controls the dummy load unit $\beta 413$ in response to a command from the control circuit 114.

For example, in a case where the current detection unit 112 detects Iload$\alpha$=200 mA and the current detection unit 412 detects Iload$\beta$=300 mA, the control circuit 114 controls the dummy load unit $\beta 413$ so as to subtract 100 mA from Iload$\beta$=300 mA by the control circuit 411.

For example, in a case where the current detection unit 112 detects Iload$\alpha$=300 mA and the current detection unit 412 detects Iload$\beta$=200 mA, the control circuit 114 controls the dummy load unit α113 to subtract 100 mA from Iloadα=300 mA by the control circuit 111.

The ripple voltage Vrip can be expressed by Equation 2.

$$Vrip\ p\text{-}p \approx Iload/(2 \times Fsw \times Cout) \quad \text{(Equation 2)}$$

Figure 7:
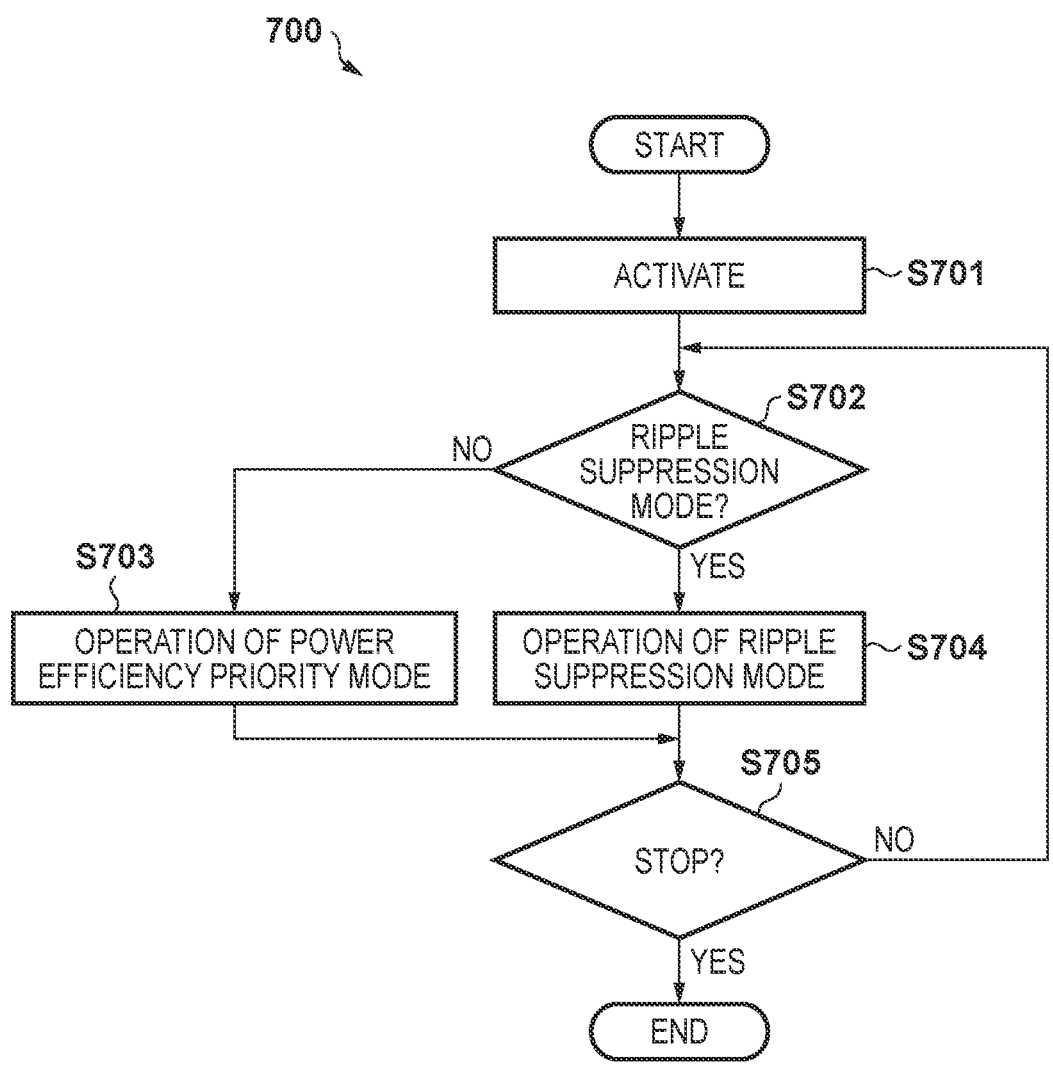
FIG. 7 is a flowchart illustrating an example of process performed by a DC/DC converter 100 having the switched capacitor circuits 101 and 401 configured in multiple stages.

Next, an example of process performed by the DC/DC converter 100 having the switched capacitor circuits 101 and 401 configured in multiple stages according to the first embodiment will be described with reference to a flowchart of FIG. 7. The process 700 of FIG. 7 is realized by the control circuit 114 of the DC/DC converter 100 executing a program stored in a memory (not shown). The process 700 is started when the electronic device 10 is powered on by the user.

In step S701, the electronic device 10 is activated by a user operation.

In step S702, the control circuit 114 determines the operation mode of the DC/DC converter 100 of the electronic device 10. The control circuit 114 determines whether the operation mode of the DC/DC converter 100 is the ripple suppression mode or the power efficiency priority mode. If the control circuit 114 determines that the operation mode of the DC/DC converter 100 is in the ripple suppression mode, the process proceeds to step S703, and if the control circuit 114 determines that the operation mode is in the ripple suppression mode, the process proceeds to step S704.

In step S703, the control circuit 114 individually controls the first switched capacitor circuit 101 and the second switched capacitor circuit 401 in accordance with the power efficiency priority mode.

In step S704, the control circuit 114 controls the dummy load unit α113 and the dummy load unit β413 such that the load current Iloadα of the first switched capacitor circuit 101 and the load current Iloadβ of the second switched capacitor circuit 401 are the same. The control circuit 114 controls the switching frequencies of the first switched capacitor circuit 101 and the second switched capacitor circuit 401 to be opposite in phase.

In step S705, the control circuit 114 determines whether or not the electronic device 10 is stopped by the user operation, and repeats the process from step S702 until it determines that the electronic device 10 is stopped.

As described above, according to the first embodiment, in the DC/DC converter 100 having the switched capacitor circuits 101 and 401 configured in multiple stages, the ripple suppression mode and the power efficiency priority mode can be switched. In the power efficiency priority mode, the output voltage Vout can be generated from the input voltage Vin by the necessary amount and power can be supplied according to the load current required by the components of the electronic device 10. In the ripple suppression mode, the switching frequencies of the switched capacitor circuits 101 and 401 are synchronized and controlled in opposite phases, whereby the ripples of the output voltage Vout can be suppressed.

Second Embodiment

Various kinds of functions, processes, or methods described in the first embodiment can also be realized by a personal computer, a microcomputer, a CPU (Central Processing Unit), or the like with a program. In a second embodiment, a personal computer, a microcomputer, a CPU, or the like will be called a "computer X" below. Also, in the second embodiment, a program for controlling the computer X and realizing various kinds of functions, processes, or methods described in the first embodiment will be called a "program Y".

Various kinds of functions, processes, or methods described in the first embodiment are realized by the computer X executing the program Y. In this case, the program Y is supplied to the computer X via a computer-readable storage medium. The computer-readable storage medium according to the second embodiment includes at least one of a hard disk device, a magnetic storage device, an optical storage device, a magneto-optical storage device, a memory card, a volatile memory (e.g., random access memory), a non-volatile memory (e.g., read only memory), or the like. The computer-readable storage medium according to the second embodiment is a non-transitory storage medium.

While aspects of the disclosure are described with reference to exemplary embodiments, it is to be understood that the aspects of the disclosure are not limited to the exemplary embodiments. The scope of the following claims is to be accorded the broadest interpretation so as to encompass all such modifications and equivalent structures.

This application claims the benefit of Japanese Patent Application No. 2019-173405, filed Sep. 24, 2019, which is hereby incorporated by reference herein in its entirety.

What is claimed is:

1. An electronic device comprising:
a first switched capacitor circuit that steps down an input voltage;
a second switched capacitor circuit that steps down an output voltage of the first switched capacitor circuit; and
a CPU,
wherein the CPU causes the electronic device to operate in any one of a plurality of modes including a first mode for suppressing a ripple of output voltage by the first switched capacitor circuit and the second switched capacitor circuit and a second mode for giving priority to power efficiency by the first switched capacitor circuit and the second switched capacitor circuit,
wherein in a case where the CPU causes the electronic device to operate in the first mode, the CPU controls the first switched capacitor circuit and the second switched capacitor circuit such that the electronic device operates in the first mode, and in a case where the CPU causes the electronic device to operate in the second mode, the CPU controls the first switched capacitor circuit and the second switched capacitor circuit such that the electronic device operates in the second mode.

2. The electronic device according to claim 1, wherein in a case where the electronic device operates in the first mode, the CPU synchronizes switching frequencies of the first switched capacitor circuit and the second switched capacitor circuit and controls the switching frequencies in opposite phases.

3. The electronic device according to claim 2, wherein in a case where the electronic device operates in the first mode, the CPU adjusts the switching frequency of the first switched capacitor circuit and the switching frequency of the second switched capacitor circuit to a higher frequency among the switching frequency of the first switched capacitor circuit and the switching frequency of the second switched capacitor circuit.

4. The electronic device according to claim 1, wherein the CPU sets a switching frequency other than the frequency band of the audible range.

5. The electronic device according to claim 1, further comprising:

a first dummy load unit connected to an output terminal of the first switched capacitor; and a second dummy load connected to an output terminal of the second switched capacitor, wherein in a case where the electronic device operates in the first mode, the CPU controls a load current of the first switched capacitor circuit and a load current of the second switched capacitor circuit by controlling the first dummy load and the second dummy load.

6. The electronic device according to claim 1, wherein in a case where the electronic device operates in the second mode, the CPU individually controls a switching frequency of the first switched capacitor circuit and a switching frequency of the second switched capacitor circuit.

7. The electronic device according to claim 1, wherein in a case where the electronic device operates in the second mode, the CPU controls switching frequencies of the first switched capacitor circuit and the second switched capacitor circuit such that a first period and a second period are repeated in turn, and wherein the CPU controls the first switched capacitor circuit and the second switched capacitor circuit such that a first capacitor and a second capacitor of the first switched capacitor circuit are connected in series and a third capacitor and a fourth capacitor of the second switched capacitor circuit are connected in parallel in the first period, and the first capacitor and the second capacitor are connected in parallel and the third capacitor and the fourth capacitor are connected in series in the second period.

8. A method comprising:

causing a first switched capacitor circuit to step down an input voltage;

causing a second switched capacitor circuit to step down an output voltage of the first switched capacitor circuit; and causing an electronic device to operate in any one of a plurality of modes including a first mode of suppressing a ripple of the output voltage by the first switched capacitor circuit and the second switched capacitor circuit and a second mode of prioritizing the power efficiency by the first switched capacitor circuit and the second switched capacitor circuit, wherein in a case of causing the electronic device to operate in the first mode, controlling the first switched capacitor circuit and the second switched capacitor circuit such that the electronic device operates in the first mode, and in a case of causing the electronic device to operate in the second mode, controlling the first switched capacitor circuit and the second switched capacitor circuit such that the electronic device operates in the second mode.

* * * * *